UNITED STATES PATENT OFFICE.

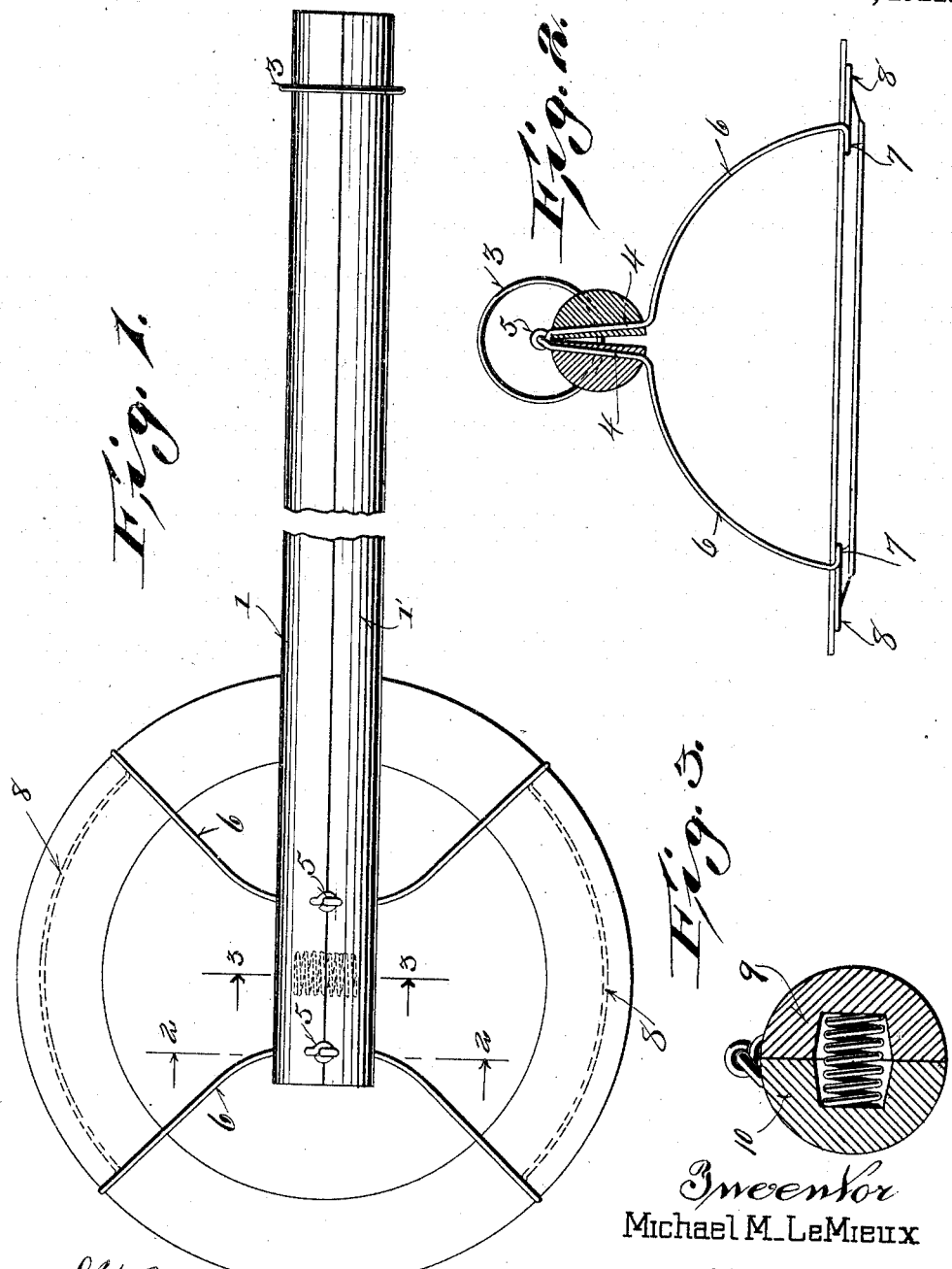

MICHAEL MORRIN LE MIEUX, OF ODANAH, WISCONSIN.

DEVICE FOR HANDLING HOT PLATES, &c.

1,372,359.

Specification of Letters Patent.   Patented Mar. 22, 1921.

Application filed April 5, 1920. Serial No. 371,446.

*To all whom it may concern:*

Be it known that I, MICHAEL MORRIN LE MIEUX, a citizen of the United States, and resident of Odanah, in the county of Ashland and State of Wisconsin, have invented certain new and useful Improvements in Devices for Handling Hot Plates, &c.; and I do hereby declare that the following is a full, clear, and exact description thereof.

My invention refers especially to cooking utensils, and it has for its object to provide a simple, economical and effective holder for manipulating hot plates, pans or the like to thus avoid burning of the hands or arms of the operator and it also renders unnecessary the use of unsanitary cloth pads or similar holders, which are frequently used and under various conditions are found impractical to accomplish the desired results.

With the above objects in view, the invention consists in certain peculiarities of construction and combination of parts as herein set forth with reference to the accompanying illustrations and subsequently claimed.

In the drawings:

Figure 1 represents a plan view of a plate holder embodying the features of my invention, the same being shown adjusted to a plate.

Fig. 2, a cross section of the same, the section being indicated by line 2—2 of Fig. 1, and Fig. 3, a detail cross section of the handle upon a magnified scale, showing a simple spring mechanism for spreading the jaws of the holder.

Referring by characters to the drawings, 1 and 1' represent a two part handle which is split longitudinally and is preferably rounded for convenience in manipulation, it being understood that the handle may be any desired length so that the operator can manipulate the device at a safe distance from the point of heat. The outer end of the two part handle is hingedly connected by a ring 3 which passes through apertures in the handle sections, as best shown in Fig. 3, and the inner end of said handle sections are hingedly connected by wire stretches 4—4 which pass through the sections as best shown in Fig. 3, and are formed with eyes 5, which are interlocked and constitute hinged members.

As best shown in Fig. 1 there are two sets of wire stretchers spaced apart and at the point where they project through the lower portion of the handle sections, they are bowed outwardly as shown at 6—6 to form stirrups of any desired width. Each of the stirrups 6—6 are formed with inturned legs 7, which legs are connected by circular lips 8. These stirrups constitute a pair of wire jaw members which are adapted to open and close with reference to their pivoted connection 5, whereby the lips 8 will engage the edge surface of the pan or plate so as to form a support for the same, whereby it can readily be lifted and carried from place to place without physical contact therewith.

The jaw members as a whole are normally spread apart by a coil spring 9, which coil spring is best shown in Fig. 3 and is nested within registered cavities 10 that are formed in the handle sections 1 and 1' between the hinge members 5.

In operation it is only necessary to drop the jaw members over the edges of the plate and thereafter squeeze the two part handle so that the same will close in opposition to the spring 9 whereby the lips 8 of the jaw members will, in connection with the bail stretches 6, securely grip the plate or pan, whereby it can be held firmly and manipulated without danger of contact. It being understood that such plates for baking pies and the like are quite hot and thus the long handle will permit the house-wife to insert the holder within the stove and readily grasp these plates and remove them to any location desired.

While I have shown a simple coil spring for spreading the handle sections apart, obviously the structural features of the spring connection and other parts may be varied, without departing from the spirit of the invention.

I claim:

In a plate holder of the character described comprising a two-part handle member split longitudinally, wire plate holder jaw members having stretches extending through each of the handle parts, the same terminating with interlocked eyed ends constituting a hinged element for one end of the handle parts, a hinged member for the other end of said handle parts and a transversely disposed compression spring embedded within the handle parts for spreading the same, whereby the jaws are opened.

In testimony that I claim the foregoing I have hereunto set my hand at Odanah, in the county of Ashland and State of Wisconsin.

MICHAEL MORRIN LE MIEUX.